United States Patent [19]
Sutton et al.

[11] Patent Number: 5,920,719
[45] Date of Patent: Jul. 6, 1999

[54] EXTENSIBLE PERFORMANCE STATISTICS AND TRACING REGISTRATION ARCHITECTURE

[75] Inventors: Carl D. Sutton, Palo Alto; Marianne Hsien-Ming Hsiung, Woodside, both of Calif.

[73] Assignee: Apple Computer, Inc., Cupertino, Calif.

[21] Appl. No.: 08/554,402

[22] Filed: Nov. 6, 1995

[51] Int. Cl.[6] ........................................................ G06F 9/45
[52] U.S. Cl. ............................................................ 395/704
[58] Field of Search .................................... 395/601, 614, 395/704, 184.01, 183.21, 182.18, 183.07, 703, 183.13, 183.14; 364/264, 267

[56] References Cited

U.S. PATENT DOCUMENTS

| | | | |
|---|---|---|---|
| 4,849,879 | 7/1989 | Chinnaswamy et al. | 364/200 |
| 5,220,562 | 6/1993 | Takada et al. | 370/404 |
| 5,301,290 | 4/1994 | Tetzlaff et al. | 711/142 |
| 5,305,448 | 4/1994 | Insalaco et al. | 711/164 |
| 5,379,406 | 1/1995 | Wade | 395/500 |
| 5,440,545 | 8/1995 | Buchholz et al. | 370/426 |
| 5,485,574 | 1/1996 | Bolosky et al. | 395/183.11 |
| 5,553,235 | 9/1996 | Chen et al. | 395/182.18 |
| 5,555,396 | 9/1996 | Alferness et al. | 711/147 |
| 5,664,093 | 9/1997 | Barnett et al. | 395/183.07 |
| 5,748,881 | 5/1998 | Lewis et al. | 395/184.01 |

OTHER PUBLICATIONS

Fotouhi et al., "The Generalized Index Model For Object–Oriented Database Systems", Tenth Annual International Phoenix Conference on Computers and Communications, pp. 302–308, Mar. 1991.

Horowitz et al, "Fundamentals of Computer Algorithms", Computer Science Press, Inc., pp. 48, 58, 59 and 63, 1978.

*Primary Examiner*—Tariq R. Hafiz
*Assistant Examiner*—Peter J. Corcoran, III
*Attorney, Agent, or Firm*—Cesari & McKenna, LLP

[57] ABSTRACT

A hierarchical registration architecture manages and organizes the collection of performance information, such as statistics and tracing, for an extensible operating system of a computer. The registration architecture, or registry, comprises a multi-linked tree data structure within a main memory for accessing the performance information. Writer entities register their intent to collect and store performance information in the registry by creating objects, via novel API calls, as nodes organized within the tree structure. Each object node of the registry is named according to a convention that identifies the type of performance data collected by that node. Each object node further represents a single data item having a single data type for collecting the performance and a reference to the actual storage location of its collected performance information. Information storage preferably occurs in globally-shared memory so that any software entity can access the information.

11 Claims, 7 Drawing Sheets

EXTENSIBLE PERFORMANCE STATISTICS AND TRACING REGISTRATION ARCHITECTURE

CROSS-REFERENCE TO RELATED APPLICATIONS

This invention is related to the following U.S. Patent Applications:

U.S. patent application Ser. No. 08/553,104 now U.S. Pat. No. 5,887,167, titled SYNCHRONIZATION MECHANISM FOR PROVIDING MULTIPLE READERS AND WRITERS ACCESS TO PERFORMANCE INFORMATION OF AN EXTENSIBLE COMPUTER SYSTEM; and U.S. patent application Ser. No. 08/555,409 now U.S. Pat. No. 5,741,577, titled RUN-TIME DATA TYPE DESCRIPTION MECHANISM FOR AN EXTENSIBLE COMPUTER SYSTEM, each of which was filed on even date herewith and assigned to the assignee of the present invention.

FIELD OF THE INVENTION

The invention relates generally to registering performance metrics for software executing on a computer and, more specifically, to a registration architecture for managing and organizing statistics and other performance information pertaining to an operating system and applications of the computer.

BACKGROUND OF THE INVENTION

Software instrumentation generally includes software entities used for collecting, storing and retrieving performance metrics of a computer system.

These software entities typically include writer entities for collecting the performance information and storing that information in a designated area of main memory, called a repository. The repository preferably holds the performance information for retrieval by reader entities, which may include application programs executing on the computer.

Namespace services impose a uniform structure on the information stored in repositories. A namespace is a collection of information managed by an operating system of the computer and a namespace service, or registry, is the entity that stores and organizes that information. The registry generally provides an application programmning interface (API), which is a mechanism for an application program to obtain services from the operating system. APIs typically include a collection of system calls to the operating system requesting, for example, establishment of network connections on behalf of an application. Specifically, the application may, via system calls to the registry API, create, modify, request, add and delete information in the registry.

The performance information collected at the registry typically includes metrics relating to components of the computer system, such as a central processor unit (CPU), main memory, the operating system and input/output (I/O) system. Examples of the collected information include loading metrics of the CPU and bandwidth parameters of the memory, along with timing latencies for execution of a particular request involving the I/O system, e.g., how long it takes to complete the (entire or portions of the) request.

By collecting and retrieving performance information, the software instrumentation provides access to the internal state and behavior, i.e., "views", of the operating system and application software executing on the computer. Operating systems are complex pieces of software configured to, e.g., handle asynchronous events within a computer (such as interrupts from I/O devices), provide interprocess communication capabilities and implement complex network protocols. Operating systems also control execution of application programs; instances of those programs in execution are called processes.

Knowledge of the internal characteristics of an operating system and application processes is useful for debugging, optimization and design verification of a computer. The internal views provided by software instrumentation fall into two general categories: (i) tracing, which provides a view into the behavior of a software program by recording the time and details of its state at interesting points in a running system, and (ii) statistics, which record when and how resources, such as device drivers of the operating system, are used.

Tracing is a form of interprocess communication that enables a process to observe the execution of another process; a trace, therefore, consists of a display that chronicles the actions and results of that program execution. Specifically, the trace provides a detailed record of the program's execution path by, e.g., taking an application program and placing it under observation by a special routine that monitors the progress of the program.

Several known operating systems have capabilities to acquire and register performance information. The UNIX® operating system uses various software entities, known as KMEM readers, to access performance information stored in data structures within privileged memory for purposes of, e.g., displaying that information. Here, the performance information is collected solely within the operating system and registration is effected with a symbol table of a compiler.

Registration of information for the UNIX operating system is done implicitly by the compiler because symbols for various pieces of the information are inserted in the symbol table. Applications attempting to access the information must know precisely which symbols are meaningful, i.e., which symbols are associated with particular types of information; the applications use the KMEM readers to access that information from memory for display on a computer screen.

Another known registration mechanism allows applications to access performance information without knowledge of the various types of collected information. That is, applications can query the operating system as to the existence and types of collected information. As with the previously-described mechanism, the performance information is collected and stored solely within the operating system and, as a result, the registration mechanism is typically only available to the operating system.

Moreover, the information is registered in the namespace according to a "flat" list of entries in the registry. This registration namespace structure obviates grouping of information in a logical organization since only individual pieces of information can be identified. Not surprisingly, the list of registered entities is typically quite long and, furthermore, unwieldy and expensive to manipulate. For example, accessing specific entries of the list requires searching the entire list, typically with the use of a hashing algorithm.

Therefore, it is among the objects of the invention to provide a registration architecture that efficiently organizes performance information collected by an operating system and application program.

Another object of the present invention is to provide a registration architecture that facilitates extension of the types of performance information collected by operating systems and applications.

SUMMARY OF THE INVENTION

Briefly, the invention relates to a hierarchical registration architecture for managing and organizing the collection of performance information, such as statistics and tracing, for an extensible operating system of a computer. The registration architecture, or registry, comprises a multi-linked tree data structure resident within a main memory for storing the performance information. Writer entities "register" their intent to collect and store performance information in the registry by creating objects, via novel API system calls, as nodes organized within the tree structure.

In the illustrative embodiment, the registry is preferably embodied as a customized framework having a base class TreeNodes for defining and building the object nodes. Each object node is "named" according to a convention that identifies the nature of performance data collected by that node. Each object node further represents a single data item having a single data type for collecting the performance and a reference to the actual storage location of its collected performance information.

In accordance with an aspect of the invention, information storage preferably occurs in globally-shared memory so that any software entity can access the information. Portions of this memory are allocated as contiguous memory buffers and trace buffers, the latter of which, in the illustrative embodiment, are organized as shared, circular buffers containing various trace elements. Significantly, the object node of the invention associates its name and type of collected data with the memory location of the data type.

According to another aspect of the invention, the novel registry provides a mechanism for extending the data types used for information collection. Preferably, the data types are abstract data types ranging from primitives (such as simple counters, histograms, maximum values, minimum values, averages and rates) to user-defined data types consisting of either entirely new data types or combinations of existing primitive data types.

An example of the latter user-defined data type is a group of associated counters for collecting statistics information; another example involves a plurality of histograms organized to form a single data type wherein each histogram collects primitive items of data. In accordance with the invention, a primitive data type may thus consist of a group of multi-valued data types, with each multi-valued data type consisting of a group of single-valued data types; this relationship may be further extended to the lowest-level data types supported by the computer hardware.

Advantageously, the invention provides a registration architecture that efficiently organizes object nodes and their sets of supported data types. The multi-linked tree structure of the registry provides a more efficient organization for collecting and accessing performance information than previous linear registration structures. The hierarchical tree structure also facilitates designation of nodes with respect to the type of peformance information collected; this provides a clear distinction between, e.g., the types of information collected by the operating system and those collected by the applications. Furthermore, the novel architecture provides extensibility in that new nodes may be added and organized in relation to the existing nodes according to the naming convention and registration structure described herein.

BRIEF DESCRIPTION OF THE DRAWINGS

The above and further advantages of the invention may be better understood by referring to the following description in conjunction with the accompanying drawings in which like reference numbers indicate identical or functionally similar elements.

DETAILED DESCRIPTION OF ILLUSTRATIVE EMBODIMENT

Figure 1:
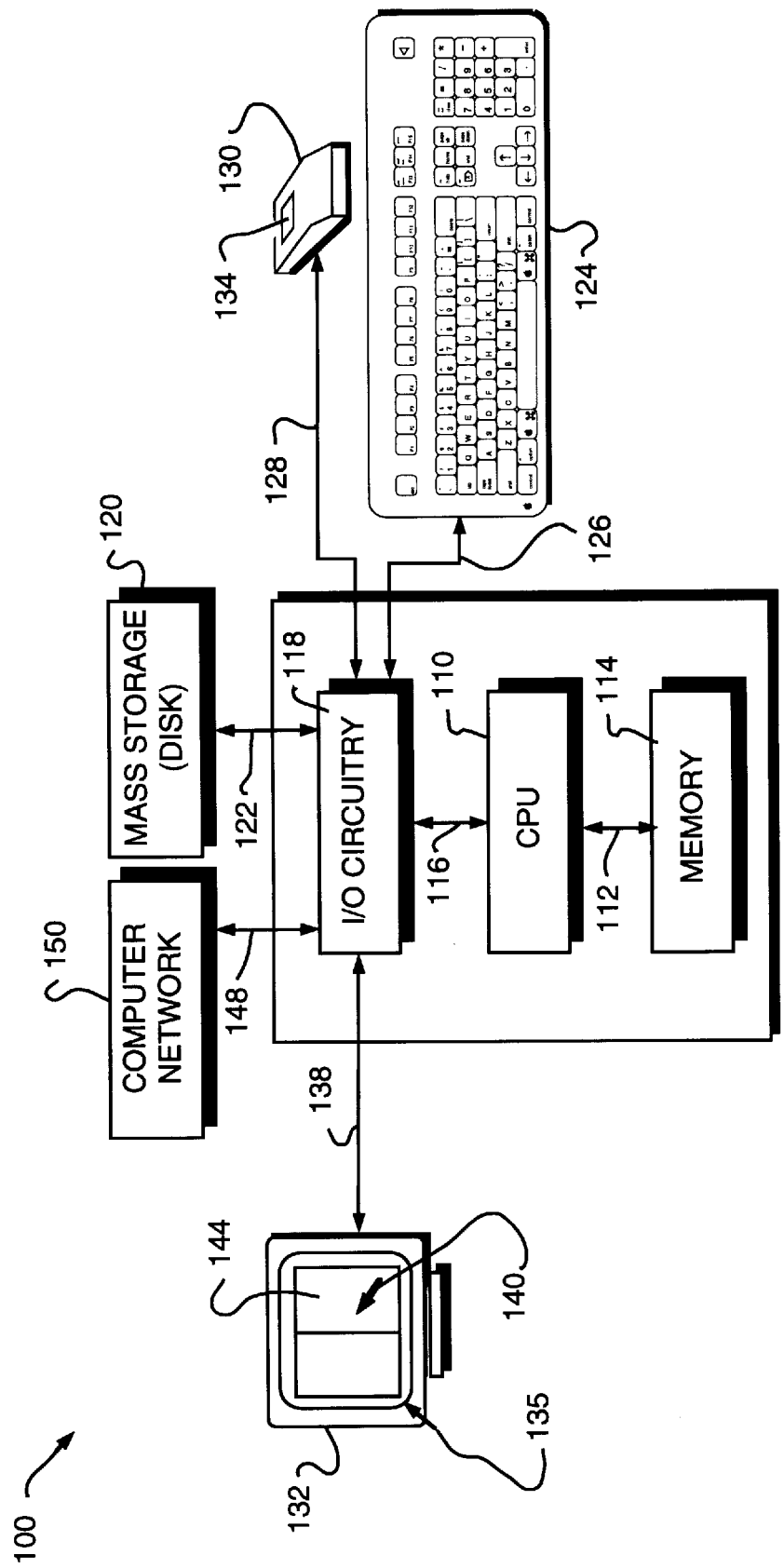
FIG. 1 is a block diagram of a computer, such as a personal computer, on which the invention may advantageously operate.

FIG. 1 illustrates a typical hardware configuration of a computer 100 comprising a central processing unit (CPU) 110 coupled between a main memory 114 and input/output (I/O) circuitry 118 by bidirectional buses 112 and 116. The memory 114 typically comprises random access memory (RAM) for temporary storage of information, including application programs (not shown), and read only memory (ROM) for permanent storage of the computer's configuration and basic operating commands, such as portions of an operating system (not shown). The application programs and operating system interact to control the operations of the CPU 110 and computer 100.

The I/O circuitry 118 is, in turn, connected to a mass storage unit 120, such as a disk drive, via a bidirectional bus 122 and to computer network 150 via bidirectional bus 148. Cursor/pointer control devices, such as a keyboard 124 and a mouse 130, connect to the circuitry 118 via cables 126 and 128, respectively. The mouse 130 typically contains at least one button 134 operated by a user of the system. A conventional display monitor 132 having a display screen 135 is also connected to I/O circuitry 118 via cable 138. A pointer (cursor) 140 is displayed on the screen 135 and its position is controllable via the mouse 130 or the keyboard 124, as is well-known.

Specifically, the I/O circuitry 118 receives information, such as control and data signals, from the mouse 130 and keyboard 124, and provides that information to the CPU 110 for transfer over the network 150, storage on the mass storage unit 120 or for display on the screen 135. It is to be understood that the I/O circuitry contains the necessary hardware, e.g., buffers and adapters, needed to interface with the control devices, the display monitor, the network and the mass storage unit. Moreover, the operating system includes the necessary software drivers to control, e.g., adapters within the I/O circuits when performing I/O operations, such as the transfer of data to and from the storage unit 120 and network 150.

The computer 100 is preferably a personal computer of the Macintosh® series of computers sold by Apple Computer Inc., although the invention may also be practiced in the context of other types of computers, including the IBM® series of computers sold by International Business Machines Corp. These computers have resident thereon, and are controlled and coordinated by, operating system software, such as the Apple® System 7®, IBM OS2®, or the Microsoft® Windows® operating systems.

Figure 2:
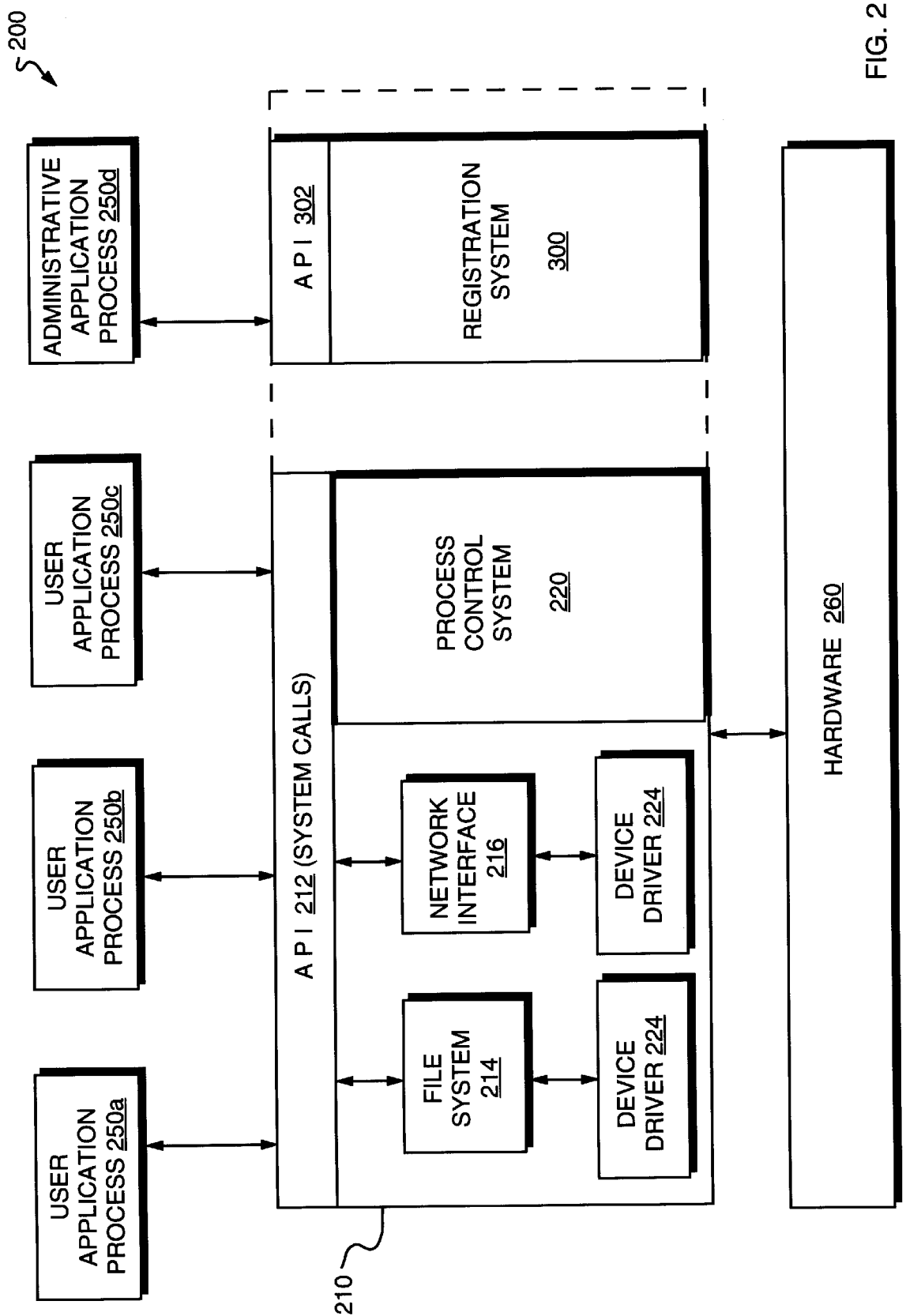
FIG. 2 is a highly schematized diagram of the hardware and software elements of the computer that includes a novel registration system of the invention.

FIG. 2 is a highly schematized block diagram of the hardware and software platform 200 of computer 100. As noted, instances of application programs executing on the computer 100 are manifested as processes 250. Although these application processes are typically user processes 250*a–c*, they may also include administrative processes 250*d* configured to perform various, "welfare-type" control functions described further herein. Administrative processes are typically distinguished from user processes only in the rights and privileges they are allowed.

Processes 250 typically interface with operating system 210 via system calls of an application programming interface (API) layer 212. Beneath the API layer are system facilities such as file system 214 and network interface 216, each of which directly implement those system calls. Process control system 220 provides basic capabilities of the operating system, such as interprocess communication and memory management.

The lower-layer of operating system 210 includes device drivers 224 for interfacing directly with the computer hardware 260. For each physical device, such as mass storage unit 120, a device driver is provided to accept requests to read and write data or determine the status of the devices. Communication between the physical devices and CPU 110 may be effected either through polling of the device drivers or via interrupts.

Located adjacent to operating system 210 is a novel registration system 300. In accordance with the present invention, the system provides a hierarchical registration architecture which enhances the organization of performance information, such as statistics and tracing, collected by software instrumentation of the operating system and/or application programs executing on the computer. The "side-by-side" arrangement between the operating system 210 and registration system 300 enables the registration system to monitor the behaviour of the operating system and its various facilities. Accordingly, the registration system 300 includes its own, independent API communication facilities 302 for, inter alia, collecting performance information for the operating system 210.

Figure 3:
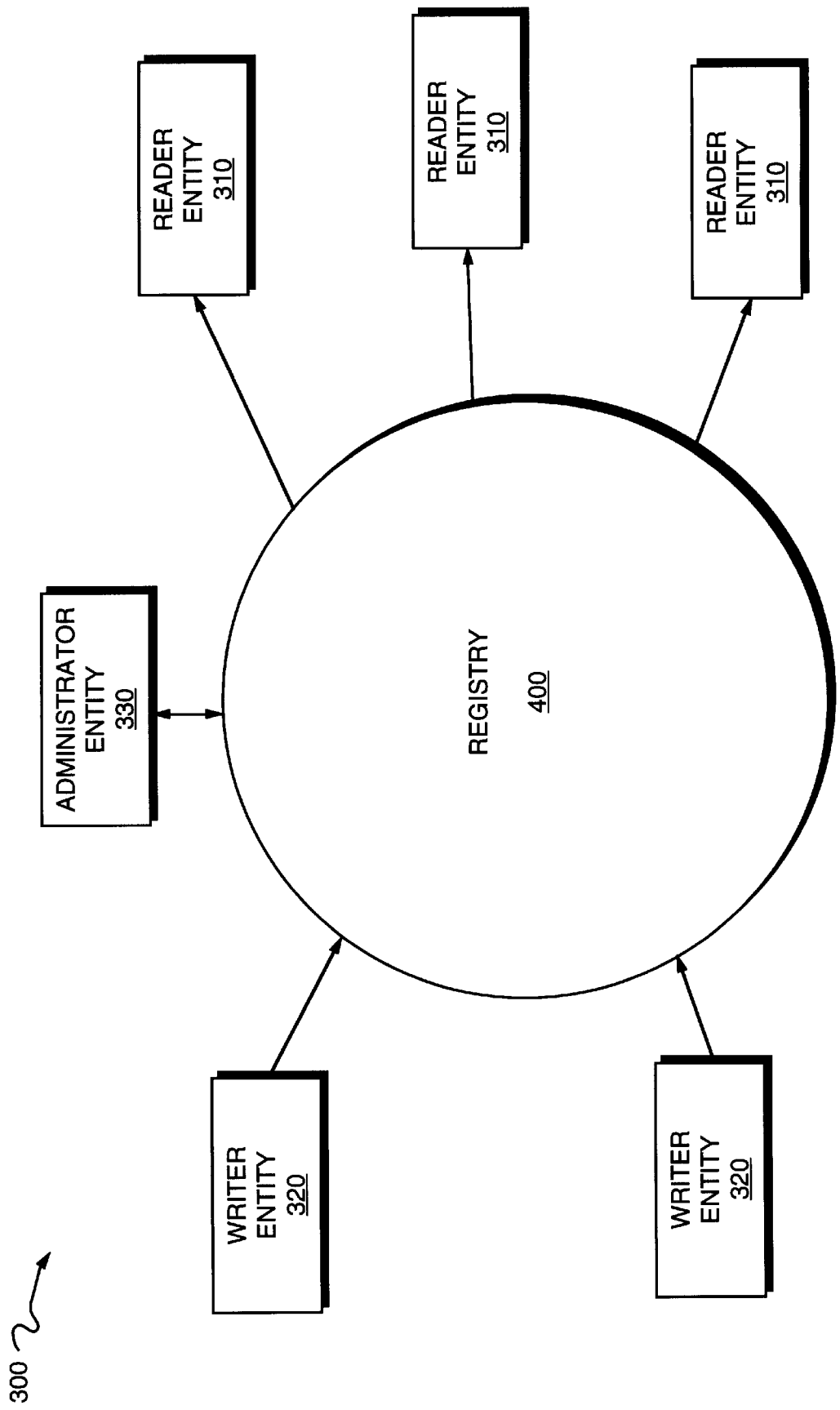
FIG. 3 is a highly schematized diagram of the registration system, including reader, writer and administrator entities interacting with a novel registry of the present invention.

FIG. 3 is a highly schematized diagram of the registration system 300 including software instrumentation of the present invention. In general, the software instrumentation comprises software entities for collecting, storing and retrieving performance information relating to the computer platform 200. That is, the software entities include a novel registry 400 for storing performance information collected by writer entities 320, retrieved by reader entitites 310 and controlled by an administrator entity 330.

The reader entities 310 typically include user application processes 250*a–c* desirous of obtaining performance information from the registry 400, while the writer entities 320 include those processes along with operating system components, such as device drivers 224, configured to collect performance information and "write" that information to the registry. The administrator entity 330 typically comprises administrative process 250*d* and is depicted as interacting with registry 400 via a two-headed arrow; this denotes that administrative process 330 is capable of directly writing information into and reading information from the registry 400 in connection with its overall control functions described herein.

Figure 4:
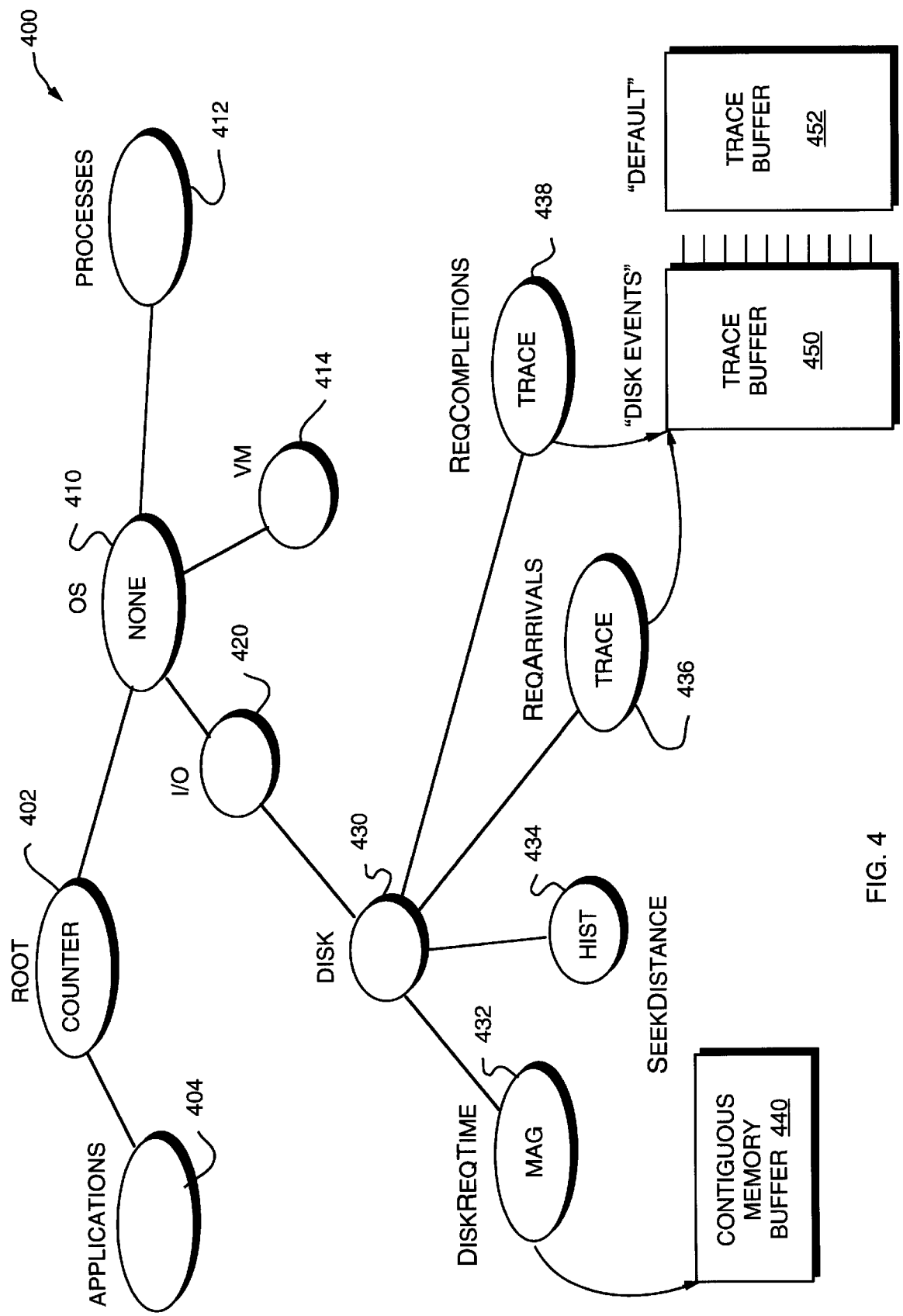
FIG. 4 is a block diagram of the novel registry for organizing and managing object nodes in accordance with the invention.

FIG. 4 is a block diagram of the registry 400 in accordance with the invention. Preferably, the registry 400 embodies a hierarchical tree data structure architecture of nodes for managing and organizing performance information, such as statistics and tracing, collected by writer entities 320. Each node represents a single data item with a single data type; in addition, as described further herein, data collection presented by each node of the tree can be independently enabled and disabled. The multi-linked tree structure is located within main memory 114 (FIG. 1) having a plurality of address locations for accessing the performance information.

In a preferred embodiment, the invention described herein is implemented as a dynamic object-oriented system, using C language in connection with object-oriented programming (OOP) techniques. The C language is well-known and many articles and texts are available which describe the language in detail. In addition, C compilers are commercially available from several vendors. Accordingly, in the interest of brevity, the details of the C language and the operation of its compiler will not be further discussed.

As will be understood by those skilled in the art, OOP techniques involve the definition, creation, use and destruction of "objects". These objects are software entities comprising data elements and routines, or functions, which manipulate the data elements. The data and related functions are treated by the software as an entity that can be created, used and deleted as if it were a single item.

Objects are defined by creating "classes" which are not objects themselves, but which act as templates that instruct the compiler how to construct an actual object. A class may, for example, specify the number and type of data variables and the steps involved in the functions which manipulate the data. Objects may be used by manipulating their data and invoking their functions.

The principle benefits of OOP techniques arise out of three basic principles: encapsulation, polymorphism and inheritance. Specifically, objects can be designed to hide, or encapsulate, all, or a portion of, its internal data structure and internal functions. Polymorphism is a concept which allows objects and functions that have the same overall format, but that work with different data, to function differently in order to produce consistent results. Inheritance, on the other hand, allows program developers to easily reuse pre-existing programs and to avoid creating software from scratch. The novel registration architecture described herein does not employ traditional inheritance mechanisms; instead, it uses a run-time data type extension mechanism that distinguishes the dynamic object-oriented nature of the system. That is, instead of determining the data type at compile time, that data type is determined at run time. An example of a run-time data type extension mechanism is provided in copending and commonly assigned U.S. patent application titled *Run-time Data Type Description Mechanism for an Extensible Computer System* designated Ser. No. 08/555,409, filed on even date herewith, which application is incorporated by reference as though fully set forth herein.

In accordance with an aspect of the present invention, the writer entities 320 "register" their intent to collect and store performance information in registry 400 by creating objects as nodes organized within the tree structure. Specifically, the writer entities 320 are designated as various portions of the tree structure and the information they collect are also described as object nodes of the tree. Each object node is preferably named according to the performance information it collects and, also, the type of data with which it is associated. For example, the root object node 402 of registry 400 is named Root and has an associated counter (Counter) data type.

Readers, on the other hand, are entities that use or examine the information for purposes of displaying it on a computer screen, recording it to a disk or sending it over a network. There can be multiple entities reading and writing information simultaneously from and to the registry 400. Significantly, each reader entity has access to all of the information collected by the writer entities within the computer. The novel registration mechanism of the architecture described herein allows these writers to inform the readers with respect to information recorded in the registry 400.

For example, the OS node 410 collects performance information for the operating system software and, in the illustrative embodiment, is used merely as an organization mechanism for the lower nodes of the tree; accordingly, this node has no associated data type. The information collected at the lower nodes of the OS node are apportioned into categories such as process-related information at Process node 412, virtual memory performance information at VM node 414 and I/O-related information at I/O node 420. This latter node includes the collection of disk-related performance information at Disk node 430.

Specifically, the node that collects statistics pertaining to times for completing disk requests is DiskRequestTime node 432; as described further herein, this node has an associated magnitude (Mag) data type. In addition, SeekDistance node 434 provides a histogram (Hist) of seek distances on the disk, e.g., how far a disk head moves for each request, while ReqCompletions node 438 provides a trace (Trace) of disk request completion times and ReqArrivals node 436 also provides a trace (Trace) of disk request arrival times. As for these latter data types, whenever a request arrives at device driver 224, a trace event, i.e., a trace message containing a description of the request, is issued; an example includes a request to a disk driver to read a particular block on disk.

Examination of the data associated with the object nodes indicates the frequency and traffic patterns of, e.g., requests arriving at the disk driver (i.e., whether there are long or short gaps between requests). The data types described above generally relate to I/O system data collection; however, it is noted that the invention applies equally to collection of performance information from other entities, such as applications. For example, Applications node 404 is designated for collecting application-related performance information.

Although OOP offers significant improvements over other programming concepts, software development still requires significant outlays of time and effort, especially if no pre-existing software is available for modification. Consequently, a prior art approach has been to provide a developer with a set of predefined classes which create a set of objects and additional miscellaneous routines that are all directed to performing commonly-encountered tasks in a particular environment. Such predefined classes and libraries are typically called "frameworks" and essentially provide a pre-fabricated structure for a working document.

While the framework approach utilizes all the principles of encapsulation, polymorphism, and inheritance in the object layer, and is a substantial improvement over other programming techniques, there are difficulties which arise. These difficulties are caused by the fact that it is easy for developers to reuse their own objects, but it is difficult for the developers to use objects generated by other programs. Further, frameworks generally consist of one or more object "layers" on top of a monolithic operating system and even with the flexibility of the object layer, it is still often necessary to directly interact with the underlying system by means of awkward procedure calls.

In the same way that a framework provides the developer with prefab functionality for a document, a system framework, such as that included in the preferred embodiment, can provide a prefab functionality for system level services which developers can modify or override to create customized solutions, thereby avoiding the awkward procedural calls necessary with the prior art frameworks. For example, consider a customizable registration architecture framework which can provide the foundation for collecting, searching and obtaining performance information of software executing on a computer. A software developer who needed these capabilities would ordinarily have to write specific routines to provide them. To do this with a framework, the developer only needs to supply the characteristic and behavior of the finished output, while the framework provides the actual routines which perform the tasks.

A preferred embodiment takes the concept of frameworks and applies it throughout the entire system, including the application programs and the operating system. For the commercial or corporate developer, systems integrator, or OEM, this means all of the advantages that have been illustrated for a framework, such as MacApp, can be leveraged not only at the application level for things such as text and graphical user interfaces, but also at the system level for such services as printing, graphics, multi-media, file systems and, as described herein, performance information registration.

Referring again to FIG. 3, the reader entities 310, writer entities 320 and administrator entity 330 are software instrumentation elements of a registration system 300 having a customizable framework for greatly enhancing the ability of a writer entity to collect and store, and a reader entity to search for and obtain, performance information in registry 400. The customizable framework further provides a platform for third-party application and operating system developers to create custom reader and writer entities for operation on a variety of hardware and software computer systems.

As noted, the nodes of the registry are preferably implemented as objects and communication between the software entities and registry is effected through novel application programming interfaces (APIs). These APIs are preferably delivered in the form of objects in a class hierarchy that is extensible so that developers can create new object nodes. From an implementation viewpoint, the objects can be subclassed and can inherit from a base class to build customized nodes that allow software entities to collect and retrieve different types of data or to create nodes that function differently from existing nodes.

In accordance with the invention, the customized framework has a base class TreeNodes for defining and building object nodes. To further understand the operations of these objects, it may be useful to examine their construction together with the major function routines that comprise the behavior of the objects. The relation of the subclasses and the functions inherent in each class may be used to predict the behavior of an object once it is constructed.

Figure 5:
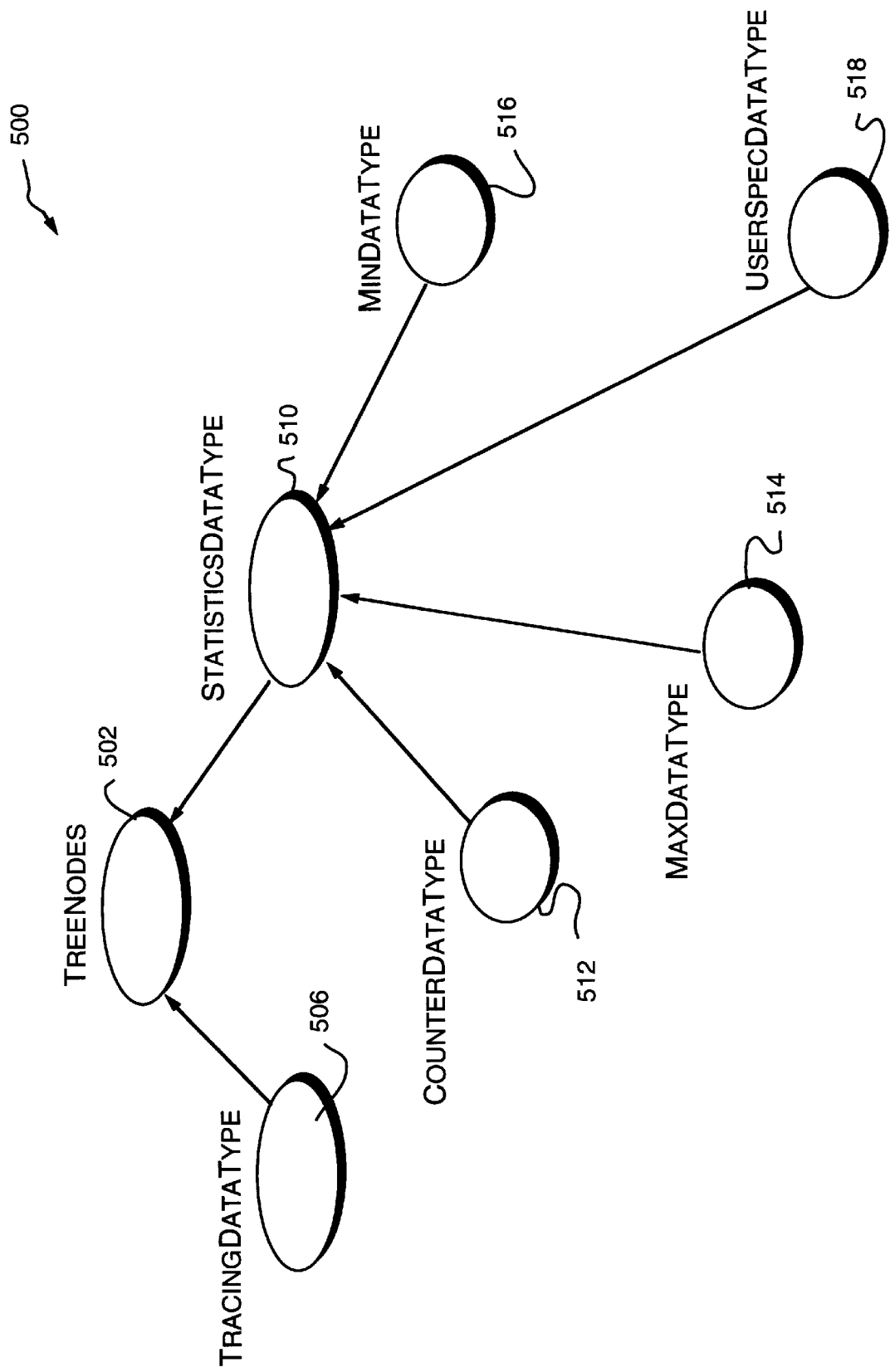
FIG. 5 is a simplified class hierarchy diagram of a base class TreeNodes used to construct the object nodes of the invention.

FIG. 5 illustrates a simplified class hierarchy diagram 500 of the base class TreeNodes 502 used to construct the object nodes. Subclasses of this base class include TracingDataType and StatisticsDataType classes 506 and 510 used to construct object nodes configured to collect various performance information for storage in the novel registry.

For example, the class StatisticsDataType 510 may be used to construct an object node for collecting statistics information, while the subclass CounterDataType 512 is derived from StatisticsDataType 510 and encapsulates an object node representing a counter comprising a simple unsigned 32-bit sum, the subclass MaxDataType 514 may be used to construct an object node for tracking the largest 32-bit unsigned value and the class MinDataType 516 is configured to encapsulate an object node tracking the smallest 32-bit unsigned value.

Since each of the classes used to construct these object nodes are subclasses of the TreeNodes base class, each class inherits the functional operators and methods that are available from that base class. For example, methods associated with the TreeNodes base class for creating a node are assumed by the subclasses to allow construction of the object nodes in a consistent manner. A sampling of the methods associated with the TreeNodes base class include (the arguments have been omitted for simplicity):
CreateNode ( );
DestroyNode ( );
Enable ( );
Disable ( ); and
ClearStatistics ( ).

In accordance with another aspect of the invention, the classes of the novel registration architecture described above provide mechanisms for extending the data types used for information collection. Preferably, the data types are abstract data types ranging from primitives (such as simple counters, maximum values, minimum values, averages and rates) to user-defined data types consisting of either entirely new data types or combinations of existing primitive data types. An example of a single primitive data type involves the creation and use of a counter to record the number of requests issued to a disk. As a disk driver receives these requests, it simply increments the counter to record the number of requests received.

In contrast, an example of a user-defined data type consisting of combinations of existing primitive data types is a group of counters configured to collect an average time to complete the requests issued to a disk. Here, one counter counts the number of requests, while another counter sums the time to complete those requests; the average time is calculated by dividing the total summed time by the total number of counts. As will be apparent to those skilled in the art, a primitive data type may thus consist of a group of multi-valued data types, with each multi-valued data type consisting of a group of single-valued data types; this relationship may be further extended to the lowest-level data types supported by the computer hardware.

A user-defined abstract data type may be further created to collect a statistic comprising maximum and minimum times to complete each disk request. This new data type is preferably constructed from the subclass UserSpecDataType 518, which is derived from StatisticsDataType 510 and encapsulates an object node capable of summing the maximum and minimum times for the disk requests to determine their averages. According to the invention, each of these statistics may be grouped together as a magnitude data type, e.g., the magnitude of request time or request completion time. Hence, the magnitude of the maximum amount of time to complete any request is the worst-case request value and the magnitude of the minimum time is the best-case request value.

Although the invention primarily relates to the management and organization of performance information stored in the registry 400, manifestation of that information, e.g., graphically on a computer screen, illustrates the usefulness of abstract data types consisting of combinations of multiple primitive element values. The inventive registration architecture further provides a means for enhancing the ability of reader, writer and administrator entities to interact with the computer when collecting, searching and obtaining performance information stored in the registry 400.

As noted, the information obtained by a reader entity may be manifested to a user of the computer via a window environment, such as the graphical user interface provided by System 7 or Windows, displayed on the screen 135 (FIG. 1) or it may be transferred over the computer network 150. In either case, the software instrumentation of registration system 300 interacts with system software routines associated with the operating system 210 to create the windows or establish network connections, as described further herein.

Specifically, the operating system interacts with the reader entity to provide higher level functionality, including a direct interface with the user. The reader entity makes use of operating system functions by issuing a series of task commands to the operating system via the API layer 212; the operating system 210 then performs the requested task. For example, the reader may request that a software driver of the operating system initiate transfer of performance information over the network 150 or that the operating system display certain information on a window 144 of the screen 135 for presentation to the user.

Figure 6:
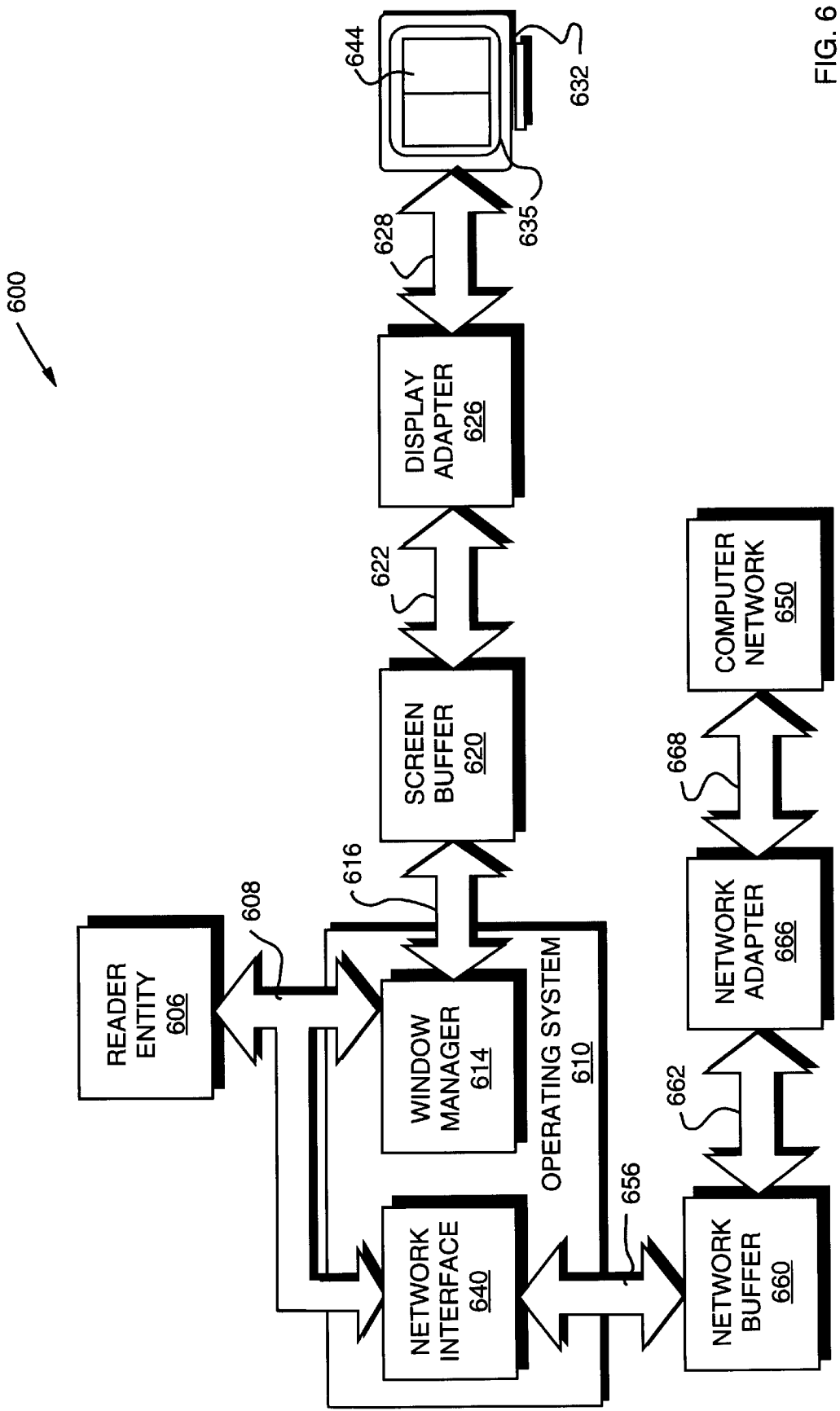
FIG. 6 is a schematic illustration of the interaction between an operating system and the reader entity of FIG. 3.

FIG. 6 is a schematic illustration of the interaction of a reader entity 602 and an operating system 610 of a computer 600, which elements are similar to those shown in FIGS. 1–4. Here, the entity 602 and operating system 610 interact to control and coordinate the operations of the computer 600 and their interaction is illustrated schematically by arrow 608. In order to present information to a user via a window environment, the reader 602 generates and sends display commands to a window manager 614 of the operating system 610.

The window environment is generally part of the operating system software 610 that includes a collection of utility programs for controlling the operation of the computer 600. The window manager 614 is a system software routine that is generally responsible for managing windows 644 that the user views during operation of the computer. That is, it is generally the task of the window manager to keep track of the location and size of the window and window areas which must be drawn and redrawn when displaying performance information to a user. The window manager 614 stores information directly (via arrow 616) into a screen buffer 620.

Under control of various hardware and software in the system, the contents of the screen buffer 620 are read out of the buffer and provided, as indicated schematically by arrow 622, to a display adapter 626. The display adapter contains hardware and software (sometimes in the form of firmware) which converts the information in the screen buffer 620 to a form which can be used to drive a display screen 635 of a monitor 632. The monitor 632 is connected to display adapter 626 by cable 628.

Figure 7:
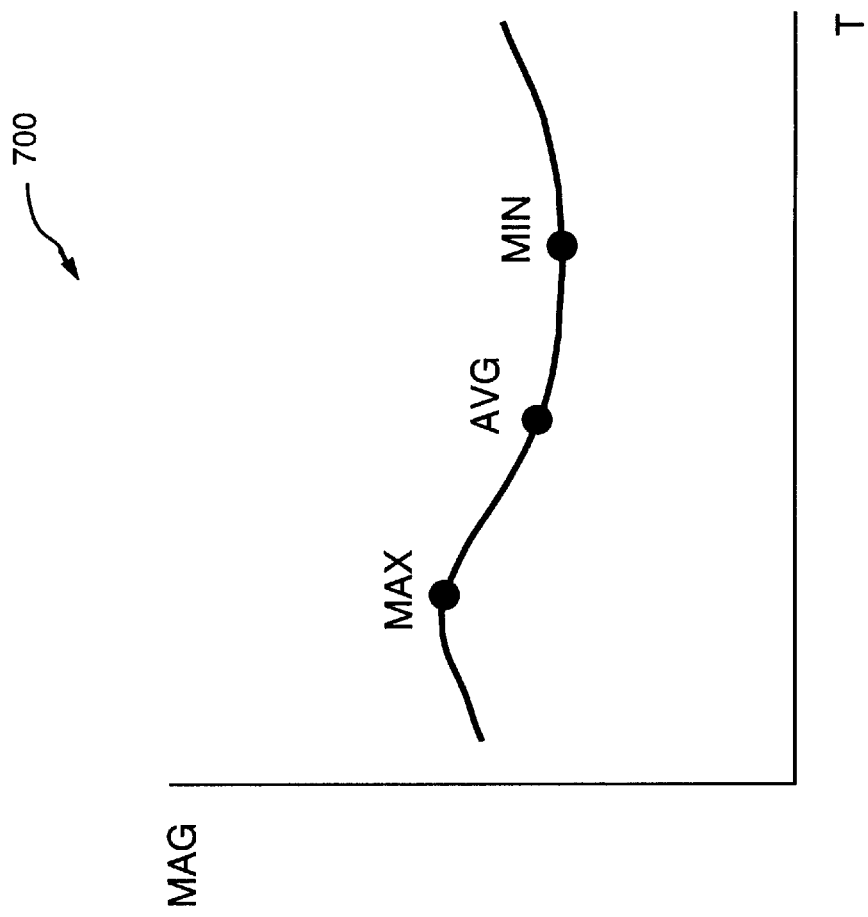
FIG. 7 is a graph illustrating a magnitude abstract data type in accordance with the invention.

FIG. 7 illustrates the elements of a magnitude data type and their manifestation on display screen 635. Specifically, the magnitude data type is collected in terms of an abstract data type consisting of a combination of four primitive data elements: a maximum value (Max Value), a minimum value (Min Value), a count (Count) and a sum of values ($\Sigma$ values). This data type quantity may be displayed on the screen as, e.g., a graph 700 depicting a stock price quote. Here, the graph has dots depicting daily maximum (max) and minimum (min) limits, and an average (avg) or close price. Clearly, the values making up the magnitude data type are more interesting when displayed collectively, as opposed to reporting each one independently.

As noted, storage of the performance information preferably occurs in globally-shared memory 114 so that any software entity can access or update the information. Referring again to FIG. 4, portions of memory 114 are allocated as contiguous memory buffers 440 to those nodes configured to collect statistics information. That is, each of these "statistics" nodes, e.g., DiskReqTime node 432, contains a pointer to a contiguous portion of memory that is allocated to that node, e.g., data buffer 440. These allocated buffers are not shared among multiple nodes because the abstract data types for the statistic data structures are well-defined; accordingly, the amount of memory space allocated is specific to each data type. The statistic nodes may thus receive different amounts of buffer capacity since each node is allocated only as much storage capacity as needed.

Information storage for object nodes collecting trace information are provided by trace buffers 450, 452. As with the data buffers described above, the trace buffers are preferably linked to the trace nodes via pointers in those nodes. Unlike the contiguous memory buffers allocated to each statistics node, however, trace buffers are named and shared among multiple nodes primarily because of their large sizes. The trace buffers are preferably configured as circular data buffers comprising various trace elements for storing multiple trace messages; according to their "circular" configuration, as new messages are added, the oldest ones are overwritten.

Specifically, trace buffers are created in response to registration of object nodes in the registry 400; this is illustrated in FIG. 4 as trace nodes 436, 438 pointing to new shared trace buffer structure DiskEvents 450. If no trace buffer is specified for a particular trace node, that node points to a default buffer called Default trace buffer 452. It should be noted that trace buffers are used solely for tracing purposes.

Operationally, the writer entities record performance information in the data buffers that the registration system 300 allocates to each node for each piece of information. The reader entities read that information from those buffers and perform various operations on it. The administrator entity controls whether any particular node's information collection is currently enabled or disabled. It is important that this latter function be controlled by a separate mechanism, e.g., a utility application, that is not directly under control of the writer.

Prior to collecting performance information for storage in registry 400, the writer entities 320 check whether collection is enabled for a particular piece of information. If a particular node is enabled, it collects the performance information and records that information in the registry. If the node is not enabled, then the writer cannot record the information. Hence, recording may be disabled for an object node; in the case of statistics collection, this implicitly "frees" the allocated memory buffer.

As a result of the tree structure architecture of the registry 400, the states of nodes with common ancestry may be modified as a group. That is, enablement and disablement of interior tree nodes, e.g., node 430 (FIG. 4), affect that node and all descendants of that node. Since extension nodes to the registry are typically created beneath a common node of the tree, information collection for the extensions can be controlled collectively or independently for each data element. As an example of the latter, the parameters within a disabled node can be changed, the node may be re-enabled and, if needed, a larger memory buffer may be allocated. The amount of memory associated with a node is thus fixed for the duration of enablement, and the node can be re-enabled to change that amount of allocated memory.

Advantageously, the invention provides a novel registry having an architecture that efficiently organizes object nodes and the different data types supported for each node. The multi-linked tree structure of the registry provides a more efficient organization for accessing and collecting performance information than the prior linear registration structures. The hierarchical tree structure also facilitates designation of nodes with respect to the type of peformance information collected; this provides a clear distinction between the types of information collected by different components of the computer. The novel architecture further provides extensibility in that new nodes may be added and organized in relation to the existing nodes according to the naming convention and registration structure of the system.

While there has been shown and described an illustrative embodiment for organizing performance information in accordance with a hierarchical registration architecture, it is to be understood that various other adaptations and modifications may be made within the spirit and scope of the invention. For example, additional system software routines may be used when implementing the invention in various applications. These additional system routines include dynamic link libraries (DLL), which are program files containing collections of window environment and networking functions designed to perform specific classes of operations. These functions are invoked as needed by the software instrumentation entities to perform desired operations. Specifically, DLLs, which are generally well-known, may be used to interact with the reader entity and operating system to provide services on retrieved performance information.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. A hierarchical registration mechanism for managing and organizing the collection of performance information for an extensible operating system of a computer having several components, the hierarchical registration mechanism comprising:

A. a memory having a plurality of address locations for accessing the performance information; and B. a plurality of object nodes for collecting the performance information for the operating system, the nodes being located in memory and organized in a multi-link tree structure including higher order nodes coupled to lower order nodes, each object node capable of being coupled to zero, one, two or more other nodes and having a name representing a specific type of information collected by the node, the specific information type being further associated with the memory address location of that information, wherein each higher order node corresponds to a particular component of the computer and the lower order nodes are apportioned into categories associated with the component corresponding to the higher order node to which they are coupled.

2. The hierarchical registration mechanism of claim 1 wherein each object node represents a single data item having a single data type for collecting the performance information.

3. The hierarchical registration mechanism of claim 2 wherein each object node further contains a reference to the actual storage location in the memory of its collected performance information.

4. The hierarchical registration mechanism of claim 3 wherein the performance information comprises statistics and wherein portions of the memory are allocated as contiguous memory buffers for collecting the statistics.

5. The hierarchical registration mechanism of claim 3 wherein the performance information comprises traces and wherein portions of the memory are allocated as trace buffers for collecting the traces.

6. The hierarchical registration mechanism of claim 1 further comprising a framework having a plurality of object classes configured to define and create the object nodes.

7. The hierarchical registration mechanism of claim 6 wherein the object classes include at least one base class and one or more sub-classes.

8. The hierarchical registration mechanism of claim 7 wherein the object nodes are defined and created in response to one or more application programming interface calls issued by a writer entity.

9. A method for managing and organizing the collection and retrieval of performance information for an extensible operating system of a computer having several components, the method comprising the steps of:

creating a plurality of object nodes, each object node representing a data item having an associated data type for collecting the performance information and a reference to the actual storage location of its collected performance information;

organizing the object nodes into a multi-link tree structure of a registry including higher order nodes coupled to lower order nodes, the higher order nodes corresponding to a particular component of the computer and the lower order nodes apportioned into categories associated with the component corresponding to the higher order node to which they are coupled, whereby each node is capable of being coupled to zero one, two or more other nodes;

collecting the performance information using writer entities designated as various portions of the tree structure;

recording the performance information in data buffers allocated to each node of the registry; and retrieving the performance information from the data buffers using reader entities configured to perform operations on the retrieved information.

10. The method of claim 9 further comprising the steps of:

controlling whether information collection is enabled for a particular node using an administrator entity; and prior to the step of collecting, checking whether collection of information is enabled for the particular node.

11. The method of claim 10 wherein the step of retrieving further comprises the step of examining the performance information for purposes of one of displaying it on a computer screen, recording it to a disk and sending it over a network.

* * * * *